//  
United States Patent [19]
Uno et al.

[11] 4,251,552  
[45] Feb. 17, 1981

[54] RICE-BALL ROLLED IN LAVER

[75] Inventors: Koki Uno; Hirohumi Youda, both of Tokyo, Japan

[73] Assignee: Kyotaru Co., Ltd., Tokyo, Japan

[21] Appl. No.: 1,866

[22] Filed: Jan. 8, 1979

[30] Foreign Application Priority Data

Feb. 21, 1978 [JP] Japan .............................. 53/20421[U]

[51] Int. Cl.³ .................... B65B 11/48; B65B 29/00
[52] U.S. Cl. ........................................ 426/115; 53/461;
53/429; 53/466; 206/492; 206/548; 229/DIG. 13; 229/87 F; 426/120; 426/410
[58] Field of Search ............... 426/106, 119, 120, 618, 426/627, 615, 643, 410, 115, 420, 500–502, 112, 132, 389, 124, 123, 410, 90, 297, 274, 275, 128, 113, 394; 53/461, 430, 211, 465, 117, 118, 466, 214, 429; 206/492, 548; 229/87 A, 56, 87 F, 87 R, DIG. 13

[56] References Cited

U.S. PATENT DOCUMENTS

| 2,918,377 | 12/1959 | Hurley et al. ................ 426/128 X |
| 3,225,920 | 12/1965 | Reilly ............................ 229/87 A |
| 3,830,035 | 8/1974 | Hoover ........................... 53/461 |
| 4,094,120 | 6/1978 | Goncalves ...................... 53/429 |
| 4,143,165 | 3/1979 | Daswick ......................... 426/120 |
| 4,145,449 | 3/1979 | Nelham ........................... 426/120 |

FOREIGN PATENT DOCUMENTS

| 479177 | 12/1951 | Canada ............................. 426/120 |
| 121012 | 8/1971 | Denmark .......................... 229/56 |
| 4535220 | 11/1970 | Japan ............................... 426/106 |

*Primary Examiner*—Steven L. Weinstein  
*Attorney, Agent, or Firm*—Peter L. Berger

[57] ABSTRACT

The present invention relates to production and packaging of rice-ball rolled in laver.

A laver is wrapped in a packing sheet for blocking moisture and rice-ball is packed by said packing sheet. The rice-ball is rolled in said laver when stripping said packing sheet. The flavor of laver is prevented from being damaged by the moisture of said rice-ball even after a long time from its production. Moreover, said rice-ball in laver can be packed surely and cleanly for selling them at drive-in store or at a station.

10 Claims, 6 Drawing Figures

RICE-BALL ROLLED IN LAVER

BACKGROUND OF THE INVENTION

A. Field of the Invention

The present invention relates to production and packaging of rice-ball rolled in laver, or more particularly, to rice-ball rolled in laver which is produced by packing the laver with a packing sheet for blocking a moisture, the rice-ball being wrapped by said packing sheet and then the rice-ball is rolled in the laver when stripping said packing sheet.

B. Description of the Prior Art

A rice-ball is a food which is produced by boiling rice, adding salt and ingredients such as vegetables or fish or shellfish and forming them by hand or mechanical means into triangular shapes or so on.

The rice-ball substantially contains a proper amount of moisture and is held in a hand without a fork when eating it.

A laver is a food which is made by drying a water plant in a sheet-like form such as rectangular and the natural flavor, dried taste and good smelling characteristics of it are appreciated.

Rice-ball rolled in laver is, as shown in FIG. 1, a portable food which is produced by covering the surface of said rice-ball with a rectangular laver. Nutrition such as a carbohydrate of said rice-ball and the, dried taste flavor of said laver can be appreciated at once. Said rice-ball rolled in laver is held in a hand when eating it in hiking or so on.

In recent years, rice-ball rolled in laver is mass-produced in food industry and sold at drive-in store or at a station. Accordingly, many problems have arisen regarding the production and packaging of said rice-ball rolled in laver. In the first place, the laver is kept covering on the rice-ball for a long while after produced in a central kitchen. Consequently, the laver becomes damp by the moisture of the rice-ball and the flavor as well as the taste of it is easily damaged. On the top of it, the damped laver sticks to a hand when eating and it is difficult to cut the laver off with the teeth. In the second place, it is necessary to properly pack the rice-ball rolled in laver in order to sell it at a store. If not properly packed, the dust sticks and the rice-ball may dry up.

In the prior art, rice-ball rolled in laver is merely packed with a plastic film and these problems are left behind.

SUMMARY OF THE INVENTION

The present invention aims at an improvement for production and packaging of rice-ball rolled in laver.

A laver is wrapped in a packing sheet for blocking moisture and a rice-ball is packed by said packing sheet. Said rice-ball is rolled in the laver when stripping said packing sheet. Namely, in the present invention, the laver and the rice-ball are separately packed by said packing sheet. Stripping the sheet and rolling the laver on the rice-ball take place side by side to produce the rice-ball rolled in laver.

The first object of the invention is to obtain a rice-ball rolled in laver whose flavor is not damaged by the moisture of the rice-ball for a long while from the production so as to taste the dried and good smelling laver.

The second object of the invention is to obtain a rice-ball rolled in laver which can be surely and cleanly packed in order to sell it at a drive-in store or at a station.

The third object of the invention is to obtain a rice-ball rolled in laver which is serviceable to hold when eating.

The above- and further objects and novel features of the invention will more fully appear from the following detailed description when the same is read in connection with the accompanying drawings. It is to be expressly understood, however, that the drawings are for purpose of illustration only and is not intended as a definition of the invention.

DETAILED DESCRIPTION OF THE PREFERRED EMBODIMENTS

The fundamental feature of the present invention lies in that the laver is wrapped in a packing sheet for blocking moisture and a rice-ball is then packed by said packing sheet and, in order to form the rice-ball rolled in laver, the laver is rolled on the rice-ball when stripping said packing sheet.

The feature of the invention will be described hereinunder with refernce to the figures.

Figure 1:
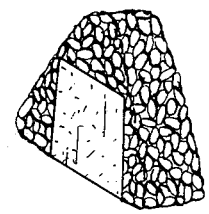
FIG. 1 is a perspective view illustrating rice-ball rolled in laver according to the prior art.
Figure 2:
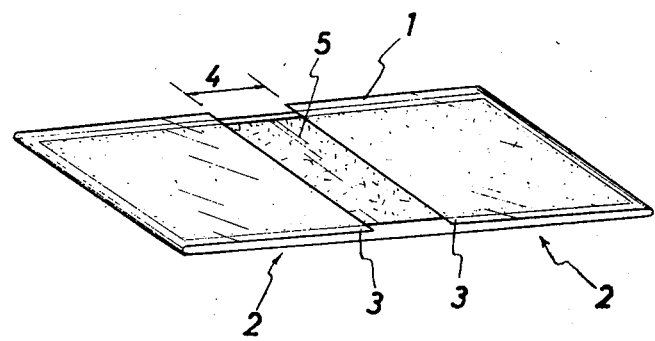
FIG. 2 is a perspective view illustrating a packing sheet which is used for rice-ball rolled in laver according to the present invention.

In FIG. 2, numeral 1 indicates a packing sheet for blocking moisture or dust and the packing sheet 1 is made of long strip of plastic film such as nylon, cellophane or polypropylene. Said packing sheet 1 may be transparent or a print sheet. The right and left of said packing sheet 1 are overlapped symmetrically to form duplicate portions 2 and in the center of it, a separate portion 4 is provided by separating each of the edge portions 3. A rectangular laver 5 is then inserted into the overlapped packing sheet 1. The length of the packing sheet 1 is nearly equal to twice of the laver 5 minus the length of the separate portion 4.

Figure 3:
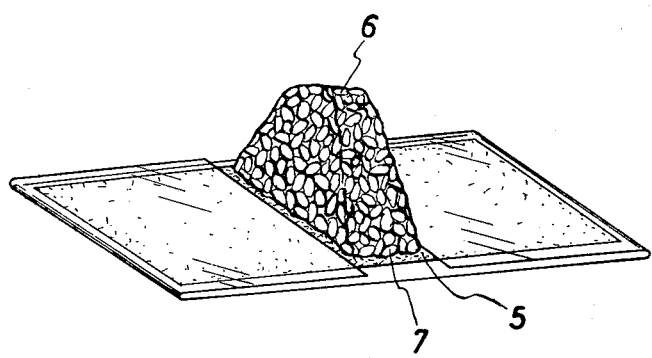
FIG. 3 is a perspective view in which the bottom of the rice-ball is adhered to the laver of a separate portion.
Figure 4:
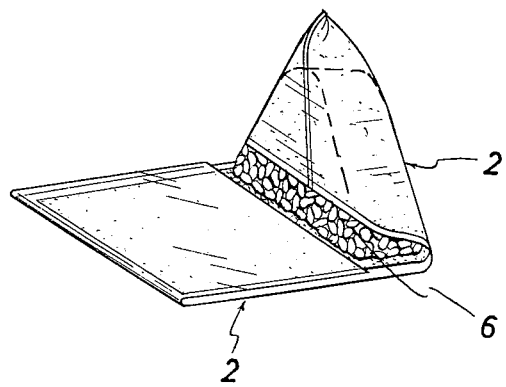
FIG. 4 is a perspective view in which one of the duplicate portion is folded to wrap the rice-ball.
Figure 5:
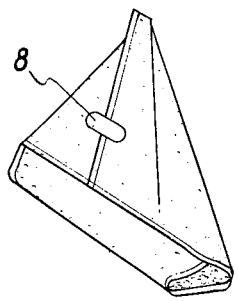
FIG. 5 is a perspective view showing the finished state of the rice-ball rolled in laver according to the present invention.

In FIG. 3, the bottom 7 of the triangular rice-ball is adhered to the laver 5 which is exposed from the separate portion 4. And then in FIG. 4, one of the duplicate portion 2 which include the laver 5 is folded to conform with the shape of rice-ball 6. In FIG. 5, another duplicate portion 2 is further overlapped on the above-said duplicate portion 2 and a label 8 is attached in order to complete packaging. In this state, the laver 5 and the rice-ball 6 are separated from each other by the packing sheet 1. Above-said separate portion 4 is not essential, each of the tip portions 3 may be close to each other. The form of the rice-ball is not limited to triangular, but the present invention is also applicable to straw-bag-shaped or cylindrical one.

Figure 6:
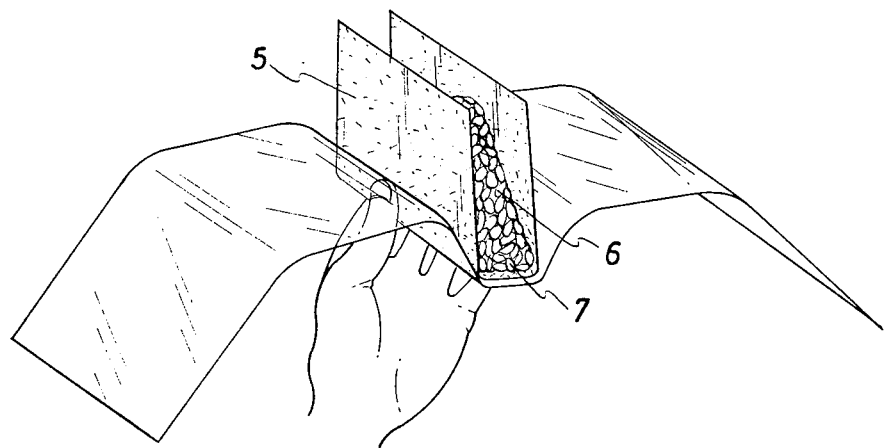
FIG. 6 is a perspective view in which the packing sheet is stripped in order to roll the laver on the rice-ball.

When eating above-described rice-ball rolled in laver, the bottom 7 is held in a hand as shown in FIG. 6 and the label 8 is then removed. Each of the folded duplicate portions 2 are stretched to uncover the laver 5 and the laver is rolled to the side of the rice-ball 6 to form the rice-ball rolled in laver. Namely, stripping the sheet and rolling the laver on the rice-ball take place side by side to produce the rice-ball rolled in laver.

Following effects can be obtained by the rice-ball rolled in laver according to the present invention.

In the first place, the flavor of laver is not damaged by the moisture of the rice-ball for a long while from production, because the rice-ball is packed by the duplicate portion of the packing sheet and is prevented from touching the laver directly. Accordingly, the dried and good smelling laver can be appreciated.

In the second place, the rice-ball rolled in laver can be surely and cleanly packed for selling them at drive-in store or at a station.

In the third place, the rice-ball adheres to the laver which is exposed at the separate portion, therefore, the laver does not slip off from the rice-ball. It is easy and convenient to hold in a hand when eating.

While there have been shown and described and pointed out the fundamental novel features of the invention as applied to preferred embodiments. It will be understood that the various omissions and substitutions and changes in the form and details of the mechanism illustrated and its operation may be made by those skilled in the art without departing from the spirit of the invention.

What is claimed is:

1. A rice-ball package for a laver rice-ball food article, said package comprising
    said rice-ball having a preformed shape,
    a thin-laver sheet adapted to cover said rice-ball to form said laver rice-ball food article to be eaten,
    a thin-pliant packing sheet formed of a fluid impervious material and comprising a length sufficient to be folded onto and substantially cover the top and bottom of said laver sheet,
    said pliant packing sheet having opposite ends and a central portion,
    said laver sheet being placed on said packing sheet, opposite ends of said packing sheet extending beyond said laver sheet and being folded inwardly on top of said unfolded laver sheet toward each other to substantially cover said unfolded laver sheet to form two pliant fluid-impervious side panels separated at said central portion exposing a portion of the laver sheet,
    said rice-ball being placed on said exposed portion of said laver sheet in said central portion, said two pliant fluid-impervious side panels including portions of said laver sheet covered by said packing sheet being folded on and conforming to the shape of said rice-ball enclosing said rice-ball to form a rice-ball package with the moisture of the rice-ball being substantially prevented from reaching said laver sheet,
    said rice-ball package serving as a hand-held foodstuff,
    said pliant packing sheet being folded away from covering said laver in said two fluid-impervious side panels to
    form a laver covered rice-ball to be eaten.

2. A rice-ball package as claimed in claim 1, wherein said packing sheet is slightly less than twice as long as said laver, said laver being exposed at a center region between the folded over opposite ends of said packing sheet, said rice-ball being placed on said center region.

3. A rice-ball package as claimed in claim 1, wherein one of said two sides panel is folded onto said rice-ball and the other side panel is then folded onto the rice-ball, further comprising label means attached to close said other side panel to complete said package.

4. A rice-ball package as claimed in claim 3, wherein said packing sheet comprises a plastic film.

5. A rice-ball package as claimed in claim 4, wherein said plastic film is transparent.

6. A rice-ball package as claimed in claim 1, wherein said laver comprises a rectangular shape and said packing sheet comprises a rectangular shape having a width at least as large as the width of said laver sheet and a length approximately twice the length of said laver sheet, said widths being as large as the width of the rice-ball being covered.

7. A rice-ball package as claimed in claim 6, wherein said packing sheet comprises a width larger than that of said laver.

8. A method for forming a seasoned rice ball to be served while folded in a laver sheet as a foodstuff yet be stored with a fluid impervious barrier substantially separating said laver sheet from said rice ball comprising
    placing a fluid impervious pliant packing sheet on a flat surface;
    placing a laver sheet on top of said fluid impervious packing sheet to be within the borders of said packing sheet,
    folding each end of said pliant packing sheets upwardly and toward each other while maintaining the laver sheet unfolded to partially cover and enclose said laver sheet forming a fluid impervious top surface and a central open region in which a portion of the laver sheet is exposed,
    placing a rice-ball on the exposed laver portion in the central region of said top surface and forming said central region and two pliant fluid impervious side panels,
    and folding each folded portion of said packing sheet including said covered portion of the laver sheet onto said rice ball to enclose and form a construction for storing said seasoned rice ball.

9. The product formed by the method of claim 8.

10. The method of claim 8, further comprising the step of unfolding said packing sheet from covering said laver to enable said laver to be in contact with said rice ball when said foodstuff is to be eaten.

* * * * *